United States Patent
Bass et al.

(10) Patent No.: US 7,819,140 B2
(45) Date of Patent: Oct. 26, 2010

(54) INTERNAL DIAMETER COATINGS FOR FIRE PROTECTION PIPING

(75) Inventors: Patrick J. Bass, Seminole, FL (US); Bruce Laumann, Crown Point, IN (US); Stephen T. Norvilas, Doylestown, PA (US); Robert D. Bussiere, Frankfort, IL (US); Kenneth J. Spellman, Philadelphia, PA (US); Richard W. Maunz, Laurel Springs, NJ (US)

(73) Assignee: Allied Tube & Conduit Corporation, Harvey, IL (US)

( * ) Notice: Subject to any disclaimer, the term of this patent is extended or adjusted under 35 U.S.C. 154(b) by 0 days.

(21) Appl. No.: 12/534,616

(22) Filed: Aug. 3, 2009

(65) Prior Publication Data

US 2010/0006172 A1     Jan. 14, 2010

Related U.S. Application Data

(63) Continuation-in-part of application No. 12/365,659, filed on Feb. 4, 2009.

(60) Provisional application No. 61/026,229, filed on Feb. 5, 2008.

(51) Int. Cl.
*F16L 9/14* (2006.01)

(52) U.S. Cl. .............. 138/145; 138/141; 138/146; 138/137; 138/140; 264/173.11

(58) Field of Classification Search ............ 138/141, 138/145, 146, 137, 140, DIG. 7; 405/156, 405/154; 264/173
See application file for complete search history.

(56) References Cited

U.S. PATENT DOCUMENTS

| | | | | |
|---|---|---|---|---|
| 2,685,707 A | * | 8/1954 | Llewellyn et al. | 264/127 |
| 3,050,786 A | * | 8/1962 | St John et al. | 264/573 |
| 3,462,825 A | * | 8/1969 | Pope et al. | 29/451 |
| 3,734,139 A | * | 5/1973 | Zafiroglu | 138/146 |
| 4,299,256 A | * | 11/1981 | Bacehowski et al. | 138/137 |
| 4,382,421 A | * | 5/1983 | Warren et al. | 118/663 |
| 4,577,549 A | * | 3/1986 | Frank et al. | 92/169.1 |
| 4,892,442 A | * | 1/1990 | Shoffner | 405/183.5 |
| 5,238,328 A | * | 8/1993 | Adams et al. | 405/183.5 |
| 5,656,070 A | * | 8/1997 | Clough | 106/14.41 |
| 5,660,899 A | * | 8/1997 | Rockney et al. | 428/34.7 |
| 5,718,027 A | * | 2/1998 | Laumann | 29/33 D |
| 6,053,452 A | * | 4/2000 | Yamakawa et al. | 244/17.19 |
| 6,197,394 B1 | * | 3/2001 | Mild et al. | 428/36.9 |
| 7,055,553 B2 | * | 6/2006 | Bessette et al. | 138/141 |
| 2005/0016610 A1 | * | 1/2005 | Lahijani | 138/145 |
| 2006/0018967 A1 | * | 1/2006 | Schildhauer | 424/486 |
| 2006/0178463 A1 | * | 8/2006 | Sacks | 524/444 |

* cited by examiner

*Primary Examiner*—Patrick F Brinson

(57) ABSTRACT

The present invention relates to in-line coating of a continuously moving substrate, such as a tube or conduit, preferably of the type used for applications such as fire sprinkler piping. The present invention includes a fire sprinkler pipe defining an interior wall surface surrounding an internal pathway. The interior surface is coated with a coating that reduces the degradation of the interior surface and provides a barrier between the interior surface and fluid within the pathway to resist degradation of the interior surface over the life of the tube or conduit.

10 Claims, 3 Drawing Sheets

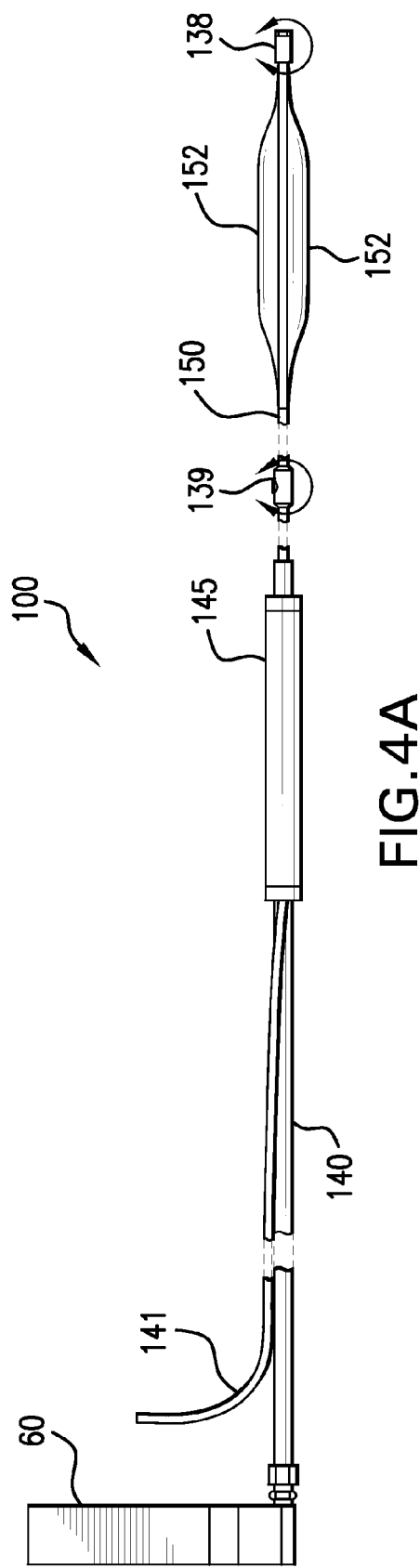
FIG.4A
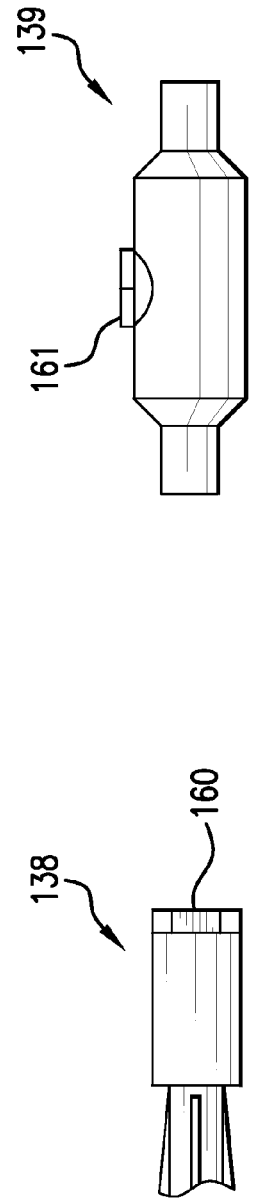
FIG.4C
FIG.4B

INTERNAL DIAMETER COATINGS FOR FIRE PROTECTION PIPING

CROSS-REFERENCE TO RELATED APPLICATIONS

This is a continuation-in-part application of U.S. application Ser. No. 12/365,659 filed Feb. 4, 2009 which claims the benefit of provisional Application No. 61/026,229 filed Feb. 5, 2008.

BACKGROUND

1. Field of the Invention The present invention is directed to tubing, piping, conduit, any roll formed closed geometric shapes and the like. More particularly, the present invention relates to coating the interior wall or surface of pipe used in fire sprinkler or non-potable or potable water transfer systems where the coating has a low friction composition to provide low flow resistance over the life of the system.

2. Discussion of Related Art

The art of forming and coating tubes, pipes and conduits (hereinafter referred to generally as "pipe" and/or "pipes") is well-established. To form a pipe, strip steel in the form of coils is supplied from a pay-out reel in a pipe forming mill or line. The width of the strip steel is proportional to the diameter of the pipe to be formed and is supplied to one or more tube forming rollers in a tube forming station to bring the longitudinal edges of the strip steel together. The edges are then welded together to form a pipe having a generally circular or closed geometric shape such as square or rectangular cross-section. After the welding process, an alkali solution may be applied to the pipe for cleaning purposes. The pipe may be subsequently heated and treated (e.g. galvanized) for corrosion protection. The pipe is typically heated before galvanizing to ensure that the temperature of the hot dip zinc is maintained at the desired temperature. Otherwise, providing a "cold" pipe to the hot dip material would decrease the temperature of the zinc during the coating process. The pipe is then cut to a desired length. The various steps in this process are aligned along the central axis of the pipe and are continuous within a mill to produce pipe at relatively high rates of speed.

As noted above, galvanizing is a process where the formed pipe is exposed to a zinc or molten metallic coating on the outside wall of the pipe. Galvanizing or metallic coating takes advantage of the protective properties of zinc or applied metal which is more resistant to corrosion than the underlying steel pipe. Advances in pipe manufacturing and galvanizing have resulted in the production of continuous pipes at rapid speeds on the order of one thousand (1000) feet per minute. Application dwell times of zinc during galvanizing have been reduced to tenths of seconds and contact zones of the pipe upon which the zinc is applied have similarly been reduced to inches. Preferred methods for coating pipes are described in U.S. Pat. Nos. 6,063,452 and 6,197,394, herein incorporated by reference. However, these processes are related to coating on the outside walls of the pipe not the inside wall of the centrally disposed pathway.

U.S. Pat. No. 5,718,027 ("the '027 patent") discloses an apparatus for the interior painting of tubing during continuous formation of the pipe which is assigned to the assignee of the present invention the contents of which are herein incorporated by reference. The '027 patent teaches the use of a spraying means which is introduced into the pipe upstream of the welding station while providing the spraying means downstream of the processing stations for forming the pipe.

Fire protection systems (e.g. sprinkler systems) employ these types of coated pipes for installation within buildings or structures to provide fire suppression liquids (e.g. water) or suppressants throughout the premises. These sprinkler systems are engineered and designed to provide the requisite amount of fire suppression fluid typically water to the desired area. However, the pipes used in these systems are susceptible to corrosion of the base metal which degrade over time. For example, the inside surface of the uncoated black pipe deteriorates over time resulting in decreased hydraulic efficiency. This is due, at least in part, to the theoretical eventual roughening of the pipe's internal diameter (I.D.) surface from oxidation (rust) or microbiological induced corrosion (M.I.C.) over the life of the pipes and systems. MIC is a corrosion process based on microorganisms (aerobes and anaerobes) and is a major cause of tuberculation, pitting and pipe failure in fire sprinkler systems employing carbon steel, copper, and galvanized pipe. To account for these factors, sprinkler systems are designed using the Hazen-Williams equation which factors in the roughness coefficient or C-Factor of the ID of the sprinkler pipe based on this pipe degradation over time. Methods used by manufacturers of fire sprinkler piping to overcome these degradation problems within the sprinkler pipe have included the use of plastic lined piping with a separate plastic insert sleeve within the interior pathway of the pipe as well as offline diffusion coatings. However, such plastic lined piping has poor heat resistance to fire combustion temperatures, causes changes in the dimension of the I.D. of the piping, has a high potential for delamination, and requires special tooling and fittings for pipe fabrication not routinely found in the fire protection industry. Another method used for pulling fiber optic cables through conduit is to provide a lubricous material impregnated in an inner duct of the conduit. However, this method does not address the degradation requirements associated with water or other fire suppressants over the life of a fire protection system. Thus, there is a need to provide a pipe that can withstand ID degradation and provide an improved C-Factor over the life of a fire sprinkler system

SUMMARY OF THE INVENTION

Exemplary embodiments of the present invention are directed to a low friction fluid transport device or pipe. In an exemplary embodiment, the low friction fluid transport device comprises a length of pipe defining a pathway therethrough. At least one inner surface surrounds the pathway which is coated with material configured to provide a barrier between a fluid contained within the pathway and the inner surface of the pipe.

The present invention relates to an in-line coating of a continuously moving pipe preferably of the type used for applications such as fire sprinkler systems. The present invention includes a fire sprinkler pipe having a wall defining a pathway therethrough. The pathway has an inner dimension and at least one surface surrounding the pathway defined by the wall. A coating is disposed on the inner surface of the wall which is configured to reduce the degradation of the ID of the pipe thereby reducing the resistance to flow of liquid media within the pathway over the life of the sprinkler system.

The present invention relates to a method of manufacturing a sprinkler pipe including supplying strip steel having a pair of longitudinally extending edges to a plurality of roll forming stations. The strip steel is bent by the roll forming stations such that the pair of longitudinally extending edges are contiguous which are welded together to form a pipe defining an internal pathway having an internal diameter and an interior surface. The pipe is supplied to a cooling station. A coating such as, for example, an epoxy, polymeric or resinous material is applied to the interior surface of the pipe to reduce degradation of the ID over the life of the pipe.

BRIEF DESCRIPTION OF THE DRAWINGS

FIGS. 4A-4C is a side view of an exemplary apparatus used to coat the inner surface of a pipe in accordance with the present invention.

DESCRIPTION OF EMBODIMENTS

Figure 1:
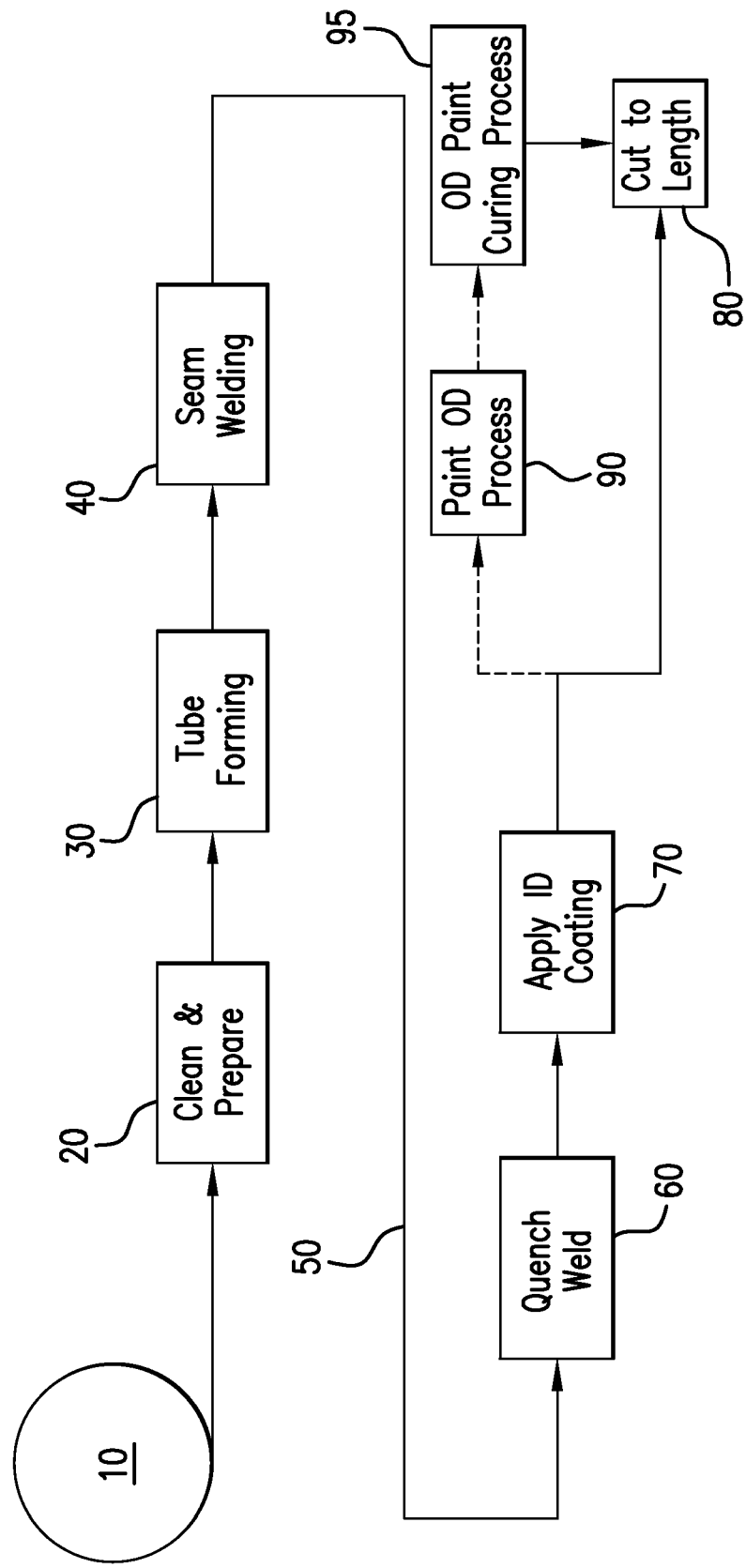
FIG. 1 is a schematic diagram of an exemplary process in accordance with the present invention.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

The present invention includes a sprinkler pipe, and methods of manufacturing the sprinkler pipe having an internal diameter (I.D.) or internal dimension where the surface surrounding the pathway is coated to maintain the I.D., resist heat associated with fire combustion as well as reducing degradation of the I.D. over the life of the pipe as compared to known pipes and conduit. As such, incorporation of a coating to the interior surface of the sprinkler pipe results in a low resistance to flow of liquids therein for extended periods of time to maintain the operation of associated sprinkler systems during its useable life. The lower friction factor over the life of the sprinkler system also translates into conservation of the required liquid handling equipment such as the pumping power and pipe wall thickness for these systems. FIG. 1 is a block diagram of an exemplary process for continuous fabrication of pipe. Strip steel is cut to the desired width and uncoiled from a supply role 10. The steel is cleaned and prepared in a station 20. The strip steel is then provided to a forming station(s) 30 which includes a plurality of rollers which bend the longitudinal edges of the strip steel to form the pipe. The number of rollers will depend on various factors including thickness and width of the steel as well as the resulting diameter of the pipe. When the edges are contiguous, they are welded together, in line, in a seam welding station 40 to form a pipe 50 having a substantially circular cross-section and an internal pathway. Typical welding temperatures for the strip steel are in the range of 2500° F. and are applied via an induction impeder which directs the heat to the pipe seam rather than allowing the energy to travel around the pipe. Alternative cross sections including, for example, oval, square, rectangle, oblong, etc., may also be employed depending on the desired application. The welded pipe 50 undergoes a quench weld at station 60 where water is applied around the outside of the pipe to provide sufficient cooling after the welding process.

Figure 3:
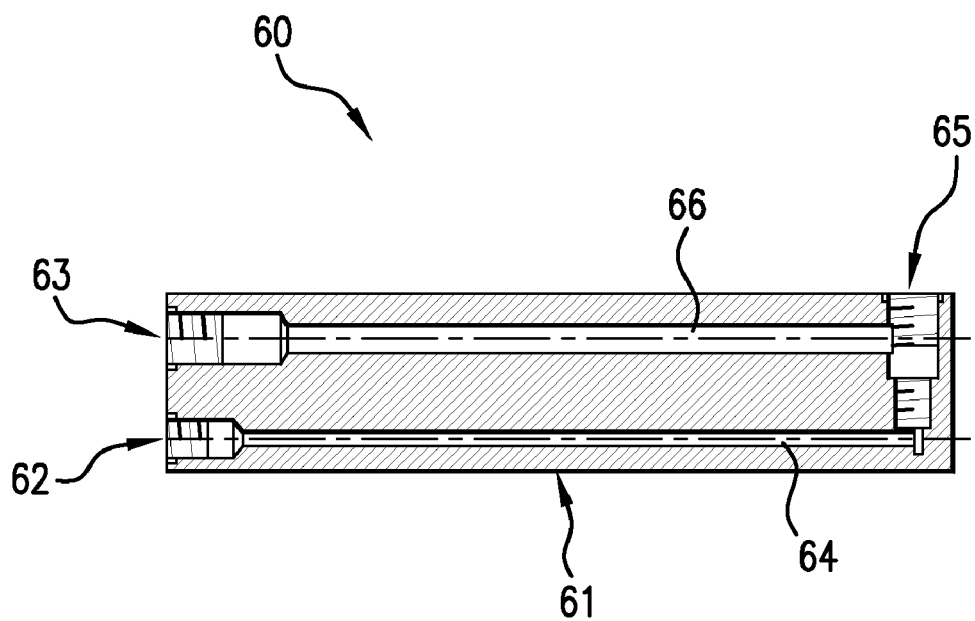
FIG. 3 is a plan view of a manifold used to supply a coating to the ID of the pipe in accordance with the present invention.

A coating is applied to the surface of the internal diameter of the pipe at station 70. This coating may be, for example, an epoxy including an epoxy finish and epoxy primer. Polymer coatings may also be used. In particular, an aromatic, aliphatic or aspartic poly urea may be applied to the ID of the pipe 50. In the case of epoxy finish and epoxy primer, the coating is a one or two part epoxy composition associated with chemical cure, moisture cure and thermal cure systems. The coating is supplied to a lance via a weld manifold as illustrated in FIGS. 3 and 4. If a polymer is used, static mixers near the manifold using separate supply lines may be required to keep the reaction time between the compounds to a minimum.

As mentioned above, uncoated steel sprinkler pipe must be designed to a friction factor of 100 to 120 to account for surface degradation such as, but not limited to pitting and roughening which reduce the hydraulics of the pipe over the life of a typical system. These conditions previously required the use of larger diameter or heavier wall piping to satisfy system flow factors to accommodate this degradation. The coating applied to the ID of the pipe provides a barrier between the liquid within the pipe and the steel wall thereby protecting the pipe from corrosion caused by oxygen and moisture. In addition, the coating, in particular the epoxy coating, has been found to have an initial C-Factor essentially the same as uncoated sprinkler pipe. However, the epoxy coated pipe decreases ID degradation of the pipe by providing a barrier between the liquid in the pipe and the interior walls thereof thereby providing an improved C-Factor over the useable life of the pipe. By reducing ID degradation of the pipe. the coating provides lower hydraulic friction over the useable life of the pipe. In addition, this resistance to degradation allows sprinkler systems to be designed factoring in a higher C-Factor over the life of the system thereby potentially allowing smaller diameter pipe and lower power fire pumps to be used while still satisfying fire suppressing liquid flow requirements. Moreover, certain coatings have exhibited microporosity which is an undesirable condition in which microscopic pitting occurs in the coating applied to the ID. This condition reduces the C-Factor over the life of the pipe.

For fire sprinkler applications, the exterior surface of pipe 50 is typically not galvanized since the pipe is usually installed within buildings or structure that do not require exterior corrosion protection. The outer surface of the pipe (which has an outer diameter (O.D.) or outer dimension) may be painted at station 90. This O.D. paint is then cured at a given temperature at station 95 as required for the particular paint. This O.D. curing process also acts to evaporate the solvents associated with the paint used for the coating applied to the ID of the pipe. The pipe 50 is cut to desired lengths at station 80. In this manner, a continuous process is used to form strip steel into pipe in which a low friction epoxy coating is applied to the interior surface of the pipe.

As mentioned earlier, the ID coating material may be, an epoxy or various types of polymers. In a preferred embodiment, an epoxy is used as the ID coating as it reduces the degradation of the ID of the pipe which results in less resistance to fluid flow through the pipe over its useable life. In other words, the epoxy coating provides a substantially non-degrading barrier protection to the interior steel surface of the pipe. The epoxy coating fills in microscopic roughness of the base metal surface of the ID to provide a smoother, lower roughness profile as compared to non-coated ID pipe without significantly affecting the internal flow pathway diameter of the pipe. In addition, the epoxy prevents the interior surface of the pipe pathway from degradation due to rusting, natural water borne minerals, water treatment chemical additives or byproducts and/or microbially influenced corrosion (M.I.C.). Similarly, a polymer is applied to the ID surface of the pipe and provides a substantially non-degrading barrier protection to the interior steel surface of the pipe. In addition, a focused application of the coating is applied to the weld seam in addition to a downstream coating of the ID surface of the pipe. This application prevents microporosity issues at the weld seam.

Figure 2:
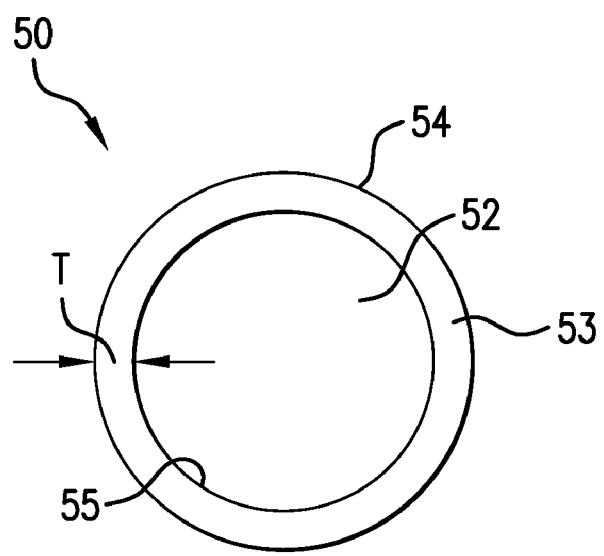
FIG. 2 is a cross sectional schematic diagram of an exemplary conduit or pipe having a coated inner surface in accordance with the present invention.

The coating may be configured to accept anti-bacterial additives that kill or provide an environment that prohibits proliferation of various strains of microbes. These additives are formulated to kill, for example, *mycobacterium tuberculosis, pseudomonas aeruginosa, E. coli*, HIV, *streptococcus* and *staphylococcus*, iron related bacteria ((IRB) *gallionella, crenothrix, sphaerotilus, siderocapsa, thiobacillus ferroxidans*), low nutrient bacteria (LNB), pseudomonas sulfate reducing bacteria (SRB), acid producing bacteria (APB), etc. For example, one known antimicrobial additive is available from SteriTouch Ltd., and has the product name ST1100 (liquid form) and ST1006 (powder form). This material may be added to the preferred embodiment epoxy coating prior to application on the ID of the pipe or may be added to the polymer prior to static mixing of the components.

As referenced above, the present invention is particularly useful in fire sprinkler piping systems. The Hazen-Williams equation is typically used in the design of fire sprinkler systems as well as other water piping systems. This equation is an empirical formula which relates the flow of water in a pipe with the physical properties of the pipe and the pressure drop caused by friction therein. In particular, the Hazen-Williams equation provides a relationship of the mean velocity of water in a pipe with the geometric properties or shape of the pipe and the slope of the energy line in which $V=k\,C\,R^{0.63}\,S^{0.54}$ where k is the conversion factor of the unit system (k=1.318 for US units); C is the roughness coefficient of the interior of the pipe, R is the hydraulic radius and S is the slope of the energy line. It is current sprinkler systems design practice to use the Hazen-Williams friction design factor of 100 to 120. This is used despite the fact that the actual physically occurring factor is 140-160 because of the expected degradation of the smoothness of the interior pathway of the pipe. The present invention prevents degradation of the smoothness of the ID surface of the pipe. In addition, the expected friction factor of the pipe is preserved over the life of the system without the need to design future degradation into the sprinkler system parameters. This lower resistance to flow within the pipes over the life of the system conserves fluid handling resources, such as lower horsepower or kilowatt pumps to provide identical flow through the pipes at lower pressure or the use of smaller diameter piping within the system. Other applications include systems having liquid flow of corrosive liquids such as, but not limited to, sewage, acidic food ingredients and/or associated by-products.

FIG. 2 is a cross sectional view of pipe 50 defined by interior pathway 52 having a central axis extending the length of the pipe. Again, although pipe 50 is shown with a generally circular cross-section, alternative geometries may also be employed having an internal pathway dimension. Pipe 50 includes a wall 53 formed from rolled strip steel having a desired thickness ‘T’ and an outer surface 54. The interior surface 51 of wall 53 includes coating 55 disposed thereon. The coating 55 may be an epoxy or may be an aromatic, aliphatic or aspartic poly urea with the preferred coating being an epoxy finish or an epoxy primer. The coating 55 is applied sufficiently to the ID to provide a barrier between the surface of the ID of pipe 50 and the fluid flowing through the internal pathway 52. As described above, the coating 55 is preferably an epoxy and adjusted for proper application via equipment described with reference to FIGS. 1, 3 and 4. The coating 55 is designed to withstand a variety of ASTM tests. In addition, anti-microbial additives may be combined with the coating 55 to prevent microbial influenced corrosion as described above. A roll groove may be formed for each of the cut pipe sections to allow for subsequent easy connection to adjacent pipes and fittings.

FIG. 3 is a cross sectional view of manifold 60 located approximate station 40 and used to supply the coating for application on the ID surface of pipe 50 at station 70. Manifold 60 is defined by body 61 and a plurality of ports 62, 63 and 65. Port 62 receives the coating and supplies it to output port 65 via channel 64. For example, if the coating is an epoxy finish or epoxy primer, the resin and hardener components may be mixed via a static mixer close enough to manifold 60 to provide adequate reaction time before being supplied to port 62 for application on the ID of pipe 50. Port 63 is used to allow $N_2$ purge via channel 66. Port 65 is configured to receive a lance 100 (shown in FIG. 4) which is used to supply the coating downstream of the weld joint to allow the weld to cure sufficient and the particular coating composition to adhere to the steel surface. In addition, port 60 may also be configured for attachment to the induction impeder used to direct heat to the pipe seam during welding.

FIGS. 4A-C illustrate an exemplary device, referred to as a lance assembly 100, which is inserted into pipe 50 downstream of the seam weld station 40, used to apply the coating 55 to the interior surface of pipe 50 at station 70 (shown with reference to FIG. 1). The lance assembly 100 includes a spray nozzle 138, a fan spray nozzle 139. and an induction impeder 145 disposed along a hose 150. A portion of hose 150 is housed longitudinally within an impeder body 140 which is connected at a first end to a port of manifold 60 to supply the coating to nozzles 138 and 139. The induction impeder 145 is disposed along the lance assembly 100 and is configured to direct heat to the pipe seam rather than allowing the heat energy to travel around the pipe during the weld operation. An additional pipe 141 connected to an external source supplies a liquid (usually water) to cool impeder 145 during operation.

The lance assembly 100 further includes a plurality of bow supports 152 which project laterally out near the spray nozzle 138 a consistent distance toward the interior surface 51 of pipe 50. This allows the spray nozzle 138 to be centered within the interior pathway 52 for even application of the coating to the interior surface 51 of pipe 50. The lance assembly is inserted into the pipe 50 downstream of the seam weld station 40 a sufficient distance to allow the weld point to cool using the quench weld station 60. This cooling period is needed to allow the coating to be successfully applied to the interior surface 51 of the interior pathway 52 of pipe 50 via nozzle 138. Otherwise the interior surface 51 will be too hot to obtain a continuous coating and will compromise the desired characteristic of the interior pathway of the pipe. It has been found that a distance of approximately 15-45 feet with a preferred distance of 21 feet is needed from the weld point to cool the pipe sufficiently to apply the coating. However, this distance is dependent on the pipe wall thickness where pipe walls which are thicker or heavier contain more heat than thin wall pipe due to the greater mass/unit area, and thus more heat/unit area as well as the particular coating composition employed. Transferring the heat out of the heavier wall through quenching takes longer times and distances greater as more heat must be removed from thicker/heavier pipe. It is important to note that the coating may be applied directly to the interior steel surface of the pipe 50 and may also include the antimicrobial additives mentioned above.

Turning briefly to FIG. 4B, spray nozzle 138 includes port 160 having a hollow cone shape with a circular cross section to impart a relatively even circular pattern of the coating onto the interior surface 51 of pipe 50. Another spray nozzle 139 is disposed upstream from nozzle 138 and is used to apply the coating focused on the weld joint. Turning briefly to FIG. 4C, spray nozzle 139 can be, for example a fan spray nozzle that includes a port 161 which applies a first application of the coating focused on the weld joint area perpendicular to the travel of pipe 50 during manufacture. Thus, nozzle 139 is upstream from nozzle 138 and applies the coating focused on the weld joint and then nozzle 138 applies the coating to the interior surface 51 of pipe 50. In this manner, any microporosity that may exist in the coating applied by nozzle 139 to the weld seam area are remedied by the coating applied downstream by nozzle 138 in addition to coating the remaining interior surface 51. The coating 55 (shown in FIG. 2) reduces the degradation associated with surface roughening and/or pitting due to corrosion on the interior surface of the steel pipe. This degradation over the life of a sprinkler system has the potential to reduce the hydraulics of the pipe by about 20% to 35% as compared to non-ID coated pipe.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A fluid transport device comprising,
   a length of pipe defining a pathway therethrough, said pipe having an inner dimension and a weld joint along a longitudinal axis of said pathway;
   at least one inner surface of said pipe surrounding said pathway;
   a first epoxy coating disposed only over the inner surface of the pipe along the weld joint; and
   a second epoxy coating disposed over the inner surface of the pipe and said first epoxy coating, wherein said first and second coatings are configured to provide a corrosion barrier between a fluid contained within said pathway and said inner surface of said pipe.

2. The fluid transport device of claim 1 wherein said first and second epoxy coatings are a resinous composition applied to the inner surface.

3. The fluid transport device of claim 1 wherein said first and second epoxy coatings are a polymeric film applied to the inner surface.

4. The fluid transport device of claim 1 wherein said inner dimension is an inner diameter of said pipe.

5. The fluid transport device of claim 1 further comprising an antimicrobial material contained within said second epoxy coating.

6. The fluid transport device of claim 1 wherein said first and second epoxies are one part epoxies.

7. The fluid transport device of claim 1 wherein each of said first and second epoxies is a two part epoxy.

8. A liquid transport device comprising,
   a length of pipe having an interior wall defining a pathway therethrough, said pipe having a weld joint along a longitudinal axis of said pathway, said pathway having an inner dimension;
   at least one surface surrounding said pathway defined by said wall; and
   a first polymer coating disposed only over the inner surface of the pipe along the weld joint; and
   a second polymer coating disposed over the first polymer coating and the inner surface of the wall, said second polymer coating configured to provide a corrosion barrier between a fluid contained within said pathway and said inner surface, said first and second polymer coatings selected from the group consisting essentially of an aromatic, aliphatic and aspartic polymer.

9. The liquid transport device of claim 8 wherein said second coating further includes an antimicrobial material.

10. The fluid transport device of claim 1 wherein said first and second epoxy coatings are different epoxy types.

* * * * *